United States Patent Office 3,080,395
Patented Mar. 5, 1963

3,080,395
2-HALO METHYL DERIVATIVES OF THE ANDROSTANE SERIES
James C. Orr, John Edwards, and Albert Bowers, all of Mexico City, Mexico, assignors, by mesne assignments, to Syntex Corporation, a corporation of Panama
No Drawing. Filed May 2, 1961, Ser. No. 107,039
27 Claims. (Cl. 260—397.4)

The present invention relates to novel cyclopentanophenanthrene compounds and to a process for the production thereof.

More particularly the present invention relates to certain novel 2-monohalomethyl and 2-dihalomethyl derivatives of the androstane and the 19-nor-androstane series, to a novel process for the production thereof as well as to certain intermediates.

The novel compounds of the present invention which are potent anabolic agents with low androgenicity, and which exhibit anti-estrogenic and anti-gonadotropic activity, inhibit the secretion of the pituitary gland and which are cardiac anti-fibrillatory agents and also lower the blood cholesterol level, are represented by the following formulas:

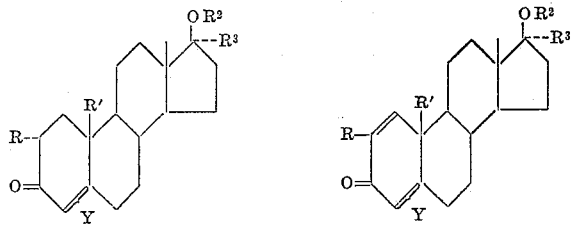

In the above formulas, R may represent a monofluoromethyl, difluoromethyl, monochloromethyl or dichloromethyl group, $R^1$ represents hydrogen or methyl, $R^2$ may be hydrogen or an acyl group derived from hydrocarbon carboxylic acids of less than twelve carbon atoms, saturated or unsaturated, of straight, branched, cyclic or cyclic-aliphatic chain, aromatic and may be substituted by functional groups such as hydroxy, alkoxy containing up to 5 carbon atoms, acyloxy containing up to 8 carbon atoms, amino, nitro or halogen. Typical ester groups are the acetate, propionate, butyrate, caproate, enanthate, trimethylacetate, t-butylacetate, phenoxyacetate, hemisuccinate, cyclopentylpropionate, aminoacetate, benzoate, and β-chloropropionate. $R^3$ represents hydrogen or an alkyl group containing up to 8 carbon atoms such as methyl, ethyl, propyl and the like. Y indicates a double bond or a saturated linkage between C–4 and C–5.

The novel 2-monohalomethyl compounds of the present invention may be prepared by a process illustrated by the following equation:

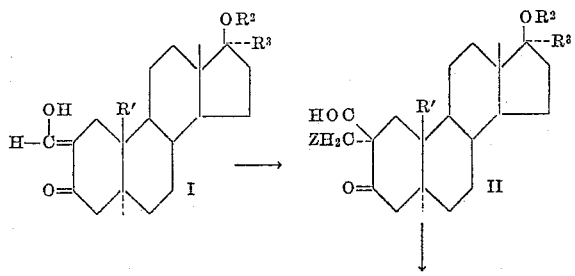

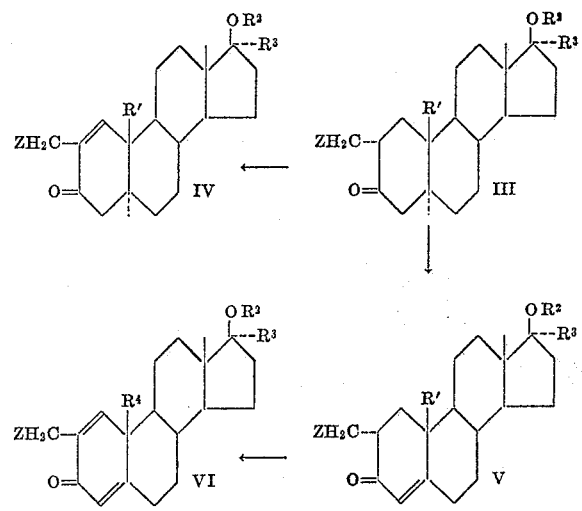

In the above formulas $R^1$, $R^2$ and $R^3$ have the same meaning as previously set forth, $R^4$ represents methyl and Z may be fluorine or chlorine.

In practicing the process outlined above, the starting compounds (I) 2-hydroxymethylene-androstan-17β-ol-3-one derivative or the corresponding 19-nor-derivative [H. J. Ringold, E. Batres, O. Halpern, and E. Necoechea, J. Am. Chem. Soc. 81, 427 (1959)] dissolved in a suitable solvent such as benzene, and in presence of an alkali metal alkoxide as for example potassium t-butoxide, are refluxed with a halo-iodomethane such as fluoro-iodomethane for a period of the order of 8 hours under a nitrogen atmosphere thus furnishing the corresponding 2β-formyl-2α-fluoromethyl androstan-17β-ol-3-one derivative or the 19-nor-derivative (II). When chloro-iodomethane is employed as the halo-iodomethane, there is obtained the 2α-chloro-methyl derivative. The formyl group of the 2β-formyl-2α-halomethyl androstan-17β-ol-3-one derivative or of the 19-nor-derivative is eliminated by refluxing the compound with an alkali metal acetate such as potassium acetate in a lower alkyl alcohol such as methanol, for a period of time of the order of 24 hours. The compound formed is the corresponding 2α-halomethyl androstan-17β-ol-3-one derivative (III).

Bromination of this compound in the presence of an alkali metal acetate such as potassium acetate and subsequent dehydrobromination of the formed compound affords the introduction of a double bond between C–1 and C–2 thus furnishing the corresponding 2-halomethyl-Δ¹-androsten-17β-ol-3-one derivative or the 19-nor-derivative (IV).

If bromination is conducted in the presence of hydrogen bromide and acetic acid, then the bromine is introduced at C–4 and by dehydrobromination of the resulting compound, there is obtained the corresponding derivative of 2α-halomethyl-Δ⁴-androsten-17β-ol-3-one or of the 19-nor-derivative thereof (V). The 2α-halomethyl-Δ⁴-androsten-17β-ol-3-one (V: $R^1$=$CH_3$) is dehydrogenated with introduction of a double bond between C–1 and C–2 by refluxing it with selenium dioxide in a suitable solvent such as t-butanol for a period of time of the order of 24 hours, furnishing the corresponding 2-halomethyl-Δ¹,⁴-androstadien-17β-ol-3-one derivative (VI).

The corresponding 2α-halomethyl-19-nor-Δ⁴-androsten-17β-ol-3-one derivatives are not submitted to the dehydrogenation with selenium dioxide because of their ready conversion into a ring A aromatic compound.

The novel 2-dihalomethyl compounds of the present invention may be prepared by a process illustrated by the following equation:

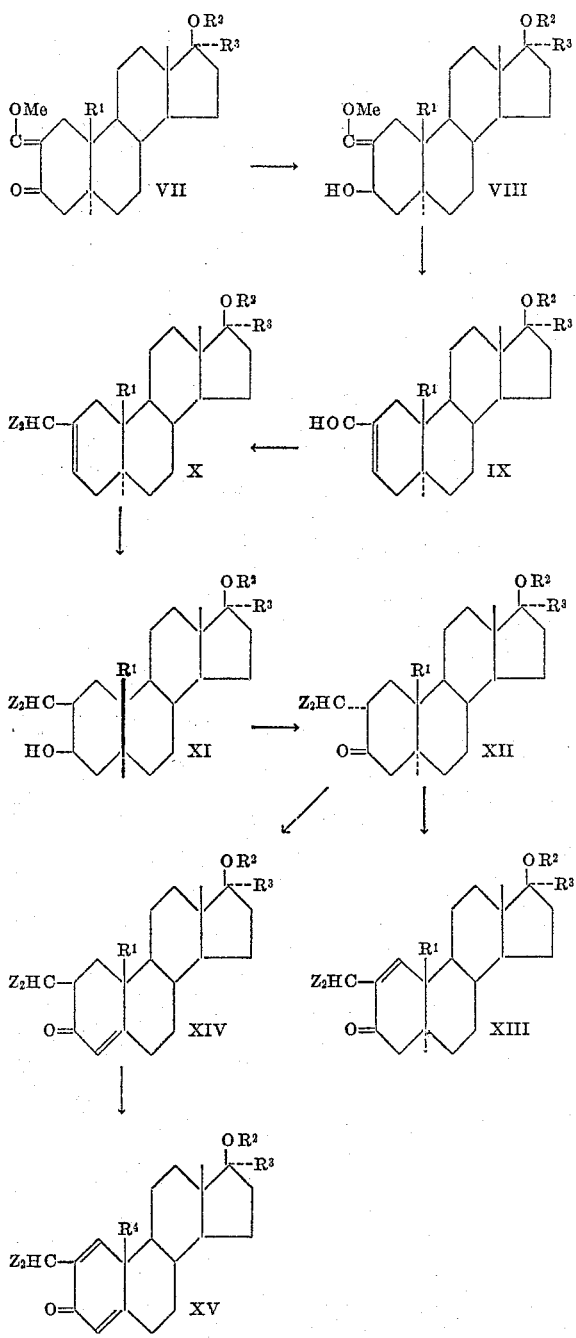

In the above formulas R¹, R², R³, R⁴ and Z have the heretofore defined meaning and Me represents the methyl group.

In practicing the process outlined above the starting compounds, 2-methoxymethylene-androstan-17β-ol-3-one derivatives or the 19-nor-analogs (VII), [Ringold and Rosenkranz, U.S. patent application Serial No. 3,746, filed January 21, 1960], are reduced with sodium boro hydride in a suitable solvent as for example aqueous tetrahydrofuran, furnishing the corresponding 2-methoxymethylene-androstan-3β,17β-diol derivative (VIII). This compound is hydrolyzed in a mild acid medium affording the corresponding derivative of 2-formyl-Δ²-androstan-17β-ol (IX).

This compound is treated with a halogenating agent such as sulfur tetrafluoride in an inert solvent as for example benzene for a period of time of 1 to 48 hours in a sealed tube at room temperature giving the corresponding 2-difluoroethyl-Δ²-androsten-17β-ol derivative (X).

When there is used as a halogenating agent phosphorus pentachloride in a more suitable solvent such as carbon tetrachloride, there is obtained the 2-dichloromethyl derivative. The 2-dihalomethyl-Δ²-androsten-17β-ol derivative is treated with a current of diborane gas and the resulting compound oxidized with hydrogen peroxide, affording the corresponding 2α-dihalomethyl-androstane-3α,17β-diol (XI). Oxidation of this compound with an oxidizing agent such as 8 N chromic acid affords the 2α-dihalomethyl-androstan-17β-ol-3-one derivative (XII) which upon bromination in the presence of an alkali metal acetate such as potassium acetate and subsequent dehydrobromination with, for example, lithium carbonate and lithium bromide in dimethylformamide affords the corresponding 2-dihalomethyl-Δ¹-androsten-17β-ol-3-one derivative or the 19-nor-derivative (XIII).

Upon bromination of the 2α-dihalomethyl-androstan-17β-ol-3-one-derivative or the 19-nor-derivative (XII) in the presence of hydrogen bromide and subsequent dehydrobromination, there is obtained the corresponding 2α-dihalomethyl-Δ⁴-androsten-17β-ol-3-one derivative or the 19-nor derivative (XIV).

Dehydrogenation of a 2α-dihalomethyl-Δ⁴-androsten-17β-ol-3-one derivative (XIV: R¹=CH₃) with a suitable agent as for example selenium dioxide affords the respective 2-dihalomethyl-Δ¹,⁴-androstadien-17β-ol-3-one derivative (XV).

The 2α-dihalomethyl-androstan-17β-ol-3-one derivatives or the 19-nor derivatives may also be obtained by condensing the corresponding androstan-17β-ol-3-one derivative or the 19-nor derivative with a dihalo-iodomethane, as for example difluoroiodomethane or dichloroiodomethane in the presence of an alkali metal hydride such as sodium hydride, in a suitable solvent, preferably benzene at a temperature of approximately 90° C. for a period of time of the order of 10 hours.

Any of the above secondary alcohol derivatives such as the 3α-hydroxy or the 17β-hydroxy derivatives may be conventionally acylated in pyridine with a hydrocarbon carboxylic acid anhydride of less than 12 carbon atoms of the type described previously. The tertiary alcohol derivatives such as the 17α-substituted-17β-hydroxy derivatives are conventionally acylated by using an excess of the acylating agent, as for example, acetic anhydride in the presence of p-toluenesulfonic acid.

The following specific examples serve to illustrate but are not intended to limit the present invention:

*Example I*

5 g. of 2-hydroxymethylene-17α-methyl-androstan-17β-ol-3-one [H. J. Ringold, E. Batres, O. Halpern, and E. Necoechea; J. Am. Chem. Soc. 81, 427 (1959)] dissolved in 100 cc. of benzene were refluxed with 30 cc. of t-butyl alcohol containing 2.5 g. of potassium and 5 g. of fluoroiodomethane for 8 hours under a nitrogen atmosphere. The bulk of this solvent was evaporated and the remainder poured into water. Isolation with methylene chloride afforded a product which upon recrystallization from methylene chloride-hexane furnished 2β-formyl-2α-fluoromethyl-17α-methyl-androstan-17β-ol-3-one.

4 g. of the foregoing compound in 80 cc. of methanol were refluxed with 4 g. of potassium acetate for 24 hours. The mixture was poured into water and the precipitate thus formed was collected by filtration. Recrystallization from acetone-hexane afforded 2α-fluoromethyl-17α-methyl-androstan-17β-ol-3-one.

Following exactly the above method, 2-hydroxymethylene-androstan-17β-ol-3-one [H. J. Ringold et al.; J. Am. Chem. Soc. 81, 427 (1959)] was treated thus giving 2α-fluoromethyl-androstan-17β-ol-3-one.

Example II 2 g. of 2α-fluoromethyl-17α-methyl-androstan-17β-ol-3-one in 50 cc. of acetic acid where treated at room temperature with a solution of 1.1 mol. equivalents of bromine in acetic acid, in the presence of 1 g. of potassium acetate. The operation was conducted with constant stirring. The resulting mixture was poured into water, the precipitate collected, washed with water, dried under vacuum and recrystallized from acetone-hexane thus furnishing 2α-bromo-2β-fluoromethyl-17α-methyl-androstan-17β-ol-3-one.

1 g. of this compound in 20 cc. of dimethylformamide was kept at 100° C. for one hour with 1 g. of lithium carbonate and 1 g. of lithium bromide. The mixture was filtered, the filtrate evaporated to dryness under reduced pressure. The solid residue was recrystallized from acetone furnishing 2-fluoromethyl-17α-methyl-$\Delta^1$-androsten-17β-ol-3-one.

According to the above procedures, 2α-fluoromethyl-androstan-17β-ol-3-one furnished 2-fluoromethyl-$\Delta^1$-androsten-17β-ol-3-one.

Example III 2 g. of 2α-fluoromethyl-17α-methyl-androstan-17β-ol-3-one (obtained according to Example I) in 50 cc. of acetic acid was treated at 20° C. with one drop of hydrogen bromide-acetic acid solution and dropwise with acetic acid containing 1.1 mol equivalents of bromine. The operation was conducted with constant stirring. The resulting mixture was poured into water and the formed precipitate was collected, washed with water, dried under vacuum and recrystallized from acetone-hexane thus furnishing 4α-bromo-2α-fluoromethyl-17α-methyl-androstan-17β-ol-3-one.

1 g. of this compound was dehydrobrominated following the technique described in Example II furnishing 2α-fluoromethyl-17α-methyl-$\Delta^4$-androsten-17β-ol-3-one.

Treating exactly by the same procedures 2α-fluoro-androstan-17β-ol-3-one, there was obtained 2α-fluoromethyl-$\Delta^4$-androsten-17β-ol-3-one.

Example IV

A mixture of 750 mg. of 2α-fluoromethyl-17α-methyl-$\Delta^4$-androsten-17β-ol-3-one, 400 mg. of selenium dioxide and 40 ml. of t-butanol was refluxed under nitrogen for 24 hours. The resulting mixture was filtered through celite, the solid residue being washed with hot ethyl acetate and the pooled solutions being concentrated under vacuum, were poured into water and extracted with ethyl acetate. Drying and evaporation of the organic layer afforded a crude product which upon recrystallization from acetone-hexane yielded 2-fluoromethyl-17α-methyl-$\Delta^{1,4}$-androstadien-17β-ol-3-one.

When applying the above technique to 2α-fluoromethyl-$\Delta^4$-androsten-17β-ol-3-one, there was obtained 2-fluoromethyl-$\Delta^{1,4}$-androstadien-17β-ol-3-one.

Example V 5 g. of 2-hydroxymethylene-17α-methyl-androstan-17β-ol-3-one were treated following exactly the technique described in Example I except that fluoro-iodomethane was substituted by chloro-iodomethane thus affording 2β-formyl-2α-chloromethyl-17α-methyl-androstan-17β-ol-3-one. Further working up of this compound, such as described in the same example yielded 2α-chloromethyl-17α-methyl-androstan-17β-ol-3-one.

2-hydroxymethylene-17α-methyl-19-nor-androstan-17β-ol-3-one [H. J. Ringold, E. Batres, O. Halpern, and E. Necoechea; J. Am. Chem. Soc. 81, 427 (1959)] was treated exactly by the foregoing procedures thus affording 2α-chloromethyl-17α-methyl-19-nor-androstan-17β-ol-3-one.

Example VI 2 g. of 2α-chloromethyl-17α-methyl-androstan-17β-ol-3-one were brominated and subsequently dehydrobrominated using exactly the same conditions described in Example II, thus giving 2-chloro-methyl-17α-methyl-$\Delta^1$-androsten-17β-ol-3-one.

Treating 2α-chloromethyl-17α-methyl-19-nor-androstan-17β-ol-3-one exactly by the same procedures, there was obtained 2-chloromethyl-17α-methyl-19-nor-$\Delta^1$-androsten-17β-ol-3-one.

Example VII 2 g. of 2α-chloromethyl-17α-methyl-androstan-17β-ol-3-one were brominated in the presence of hydrogen bromide and then dehydrobrominated following the method described in Example III, yielding 2α-chloromethyl-17α-methyl-$\Delta^4$-androsten-17β-ol-3-one.

Treatment of 2α-chloromethyl-17α-methyl-19-nor-androstan-17β-ol-3-one by the same technique afforded 2α-chloromethyl-17α-methyl-19-nor-$\Delta^4$-androsten-17β-ol-3-one.

Example VIII 750 mg. of the above-mentioned 2α-chloromethyl-17α-methyl-$\Delta^4$-androsten-17β-ol-3-one were dehydrogenized with selenium dioxide by the method described in Example IV thus furnishing 2-chloromethyl-17α-methyl-$\Delta^{1,4}$-androstadien-17β-ol-3-one.

Example IX

To a solution of 2 g. of 2-methoxymethylene-17α-methyl-androstan-17β-ol-3-one (obtained by treatment of the 2-hydroxymethylene derivative with methyl iodide, as disclosed by Ringold and Rosenkranz in U.S. patent application Serial No. 3,746, filed January 21, 1960) in 75 cc. of anhydrous tetrahydrofuran was added a solution of 2 g. of sodium borohydride in 6 cc. of water. The mixture was allowed to stand for 1 hour at room temperature. The excess reagent was decomposed by addition of acetic acid, the solution concentrated to small volume in vacuo and diluted with water. The product was extracted with ethyl acetate, the extract was washed with water, dried and evaporated to dryness. Recrystallization from acetone-hexane yielded 2-methoxymethylene-17α-methyl-androstane-3β,17β-diol.

1.5 g. of this compound was treated for one hour with 50 cc. of methanol and 0.2 cc. of concentrated hydrochloric acid, then poured into 250 cc. of saturated salt solution, extracted with ethyl acetate, washed until neutral, dried and evaporated. Recrystallization of the residue from acetone afforded 2-formyl-17α-methyl-$\Delta^2$-androsten-17β-ol.

1 g. of this latter compound dissolved in 100 cc. of benzene was treated with 2 g. of sulfur tetrafluoride and the mixture kept in a sealed tube for 5 hours at room temperature and it was then poured carefully into ice water. An excess of sodium bicarbonate was added and the product extracted with methylene chloride. The extract was washed with water to neutral and evaporated to dryness. Alumina chromatography and crystallization from acetone-hexane afforded 2-difluoromethyl-17α-methyl-$\Delta^2$-androsten-17β-ol.

2-methoxymethylene-17α-methyl-19-nor-androstan-17β-ol-3-one (obtained by treatment of the 2-hydroxymethylene derivative with methyl iodode following the method disclosed by Ringold & Rosenkranz; U.S. patent application Serial No. 3,746, filed January 21, 1960) was reduced with lithium aluminum hydride following exactly the above technique. Further hydrolysis and difluorination by the foregoing procedures yielded 2-difluoromethyl-17α-methyl-19-nor-$\Delta^2$-androsten-17β-ol.

2-methoxymethylene-androstan-17β-ol-3-one (Knox, U.S. patent application Serial No. 80,528, filed January 4, 1961), was treated by exactly the same technique furnishing 2-difluoromethyl-$\Delta^2$-androsten-17β-ol which was then conventionally acetylated to give the 2-difluoromethyl-Δ²-androsten-17β-ol-17β-acetate.

*Example X*

Several batches of 2-difluoromethyl-17α-methyl-Δ²-androsten-17β-ol were combined. 3 g. of this product in 100 cc. of tetrahydrofuran were treated with a current of 3 mol. equivalents of diborane gas, generated from a mixture of sodium borohydride and boron trifluoride etherate. The white precipitate thus formed was filtered off, washed with a small amount of ethanol and suspended in 100 cc. of this solvent. The resulting suspension was stirred for one hour at room temperature with 400 mg. of potassium hydroxide and 4 cc. of 30% hydrogen peroxide. The reaction mixture was poured into water, and extracted with methylene chloride. The extract was washed with water, dried over sodium sulfate and evaporated to dryness. Recrystallization of the residue from acetone-hexane afforded 2β-difluoromethyl-17α-methyl-androstane-3α,17β-diol.

Upon treatment of 2-difluoromethyl-Δ²-androsten-17β-ol-17β-acetate and 2-difluoromethyl-17α-methyl-19-nor-Δ²-androsten-17β-ol by the same procedure, there were obtained respectively, 2β-difluoromethyl-androstane-3α,17β-diol-17β-acetate and 2β-difluoromethyl-17α-methyl-19-nor-androstane-3α,17β-diol.

*Example XI*

A solution of 3 g. of 2β-difluoromethyl-17α-methyl-androstane-3α,17β-diol in 100 cc. of acetone was treated at 5° C. with an 8 N solution of chromic acid in diluted sulfuric acid. When a yellow color persisted in the acetone solution the mixture was poured into water and the product extracted with ether. Evaporation and recrystallization of the residue from acetone-hexane afforded 2α-difluoromethyl-17α-methyl-androstan-17β-ol-3-one.

When applying this method to 2β-difluoromethyl-androstane-3α,17β-diol 17β-acetate and to 2β-difluoromethyl-17α-methyl-19-nor-androstane-3α,17β-diol, there were obtained, respectively, 2α-difluoromethyl-androstan-17β-ol-3-one 17β-acetate and 2α-difluoromethyl-17α-methyl-19-nor-androstan-17β-ol-3-one.

*Example XII*

2 g. of 2α-difluoromethyl-17α-methyl-androstan-17β-ol-3-one were brominated in the presence of potassium acetate following the technique described in Example II. The product thus obtained was dehydrobrominated by the procedure described in the same example furnishing 2-difluoromethyl-17α-methyl-Δ¹-androsten-17β-ol-3-one.

Treating in the same way 2α-difluoromethyl-androstan-17β-ol-3-one 17-acetate and 2α-difluoromethyl-17α-methyl-19-nor-androstan-17β-ol-3-one, there were obtained, respectively, 2-difluoromethyl-Δ¹-androsten-17β-ol-3-one-17β-acetate and 2-difluoromethyl-17α-methyl-19-nor-Δ¹-androsten-17β-ol-3-one.

*Example XIII*

2 g. of 2α-difluoromethyl-17α-methyl-androstan-17β-ol-3-one were brominated in the presence of hydrogen bromide and subsequently dehydrobrominated by the technique described in Example III, thus giving 2α-difluoromethyl-17α-methyl-Δ⁴-androsten-17β-ol-3-one.

Using exactly the same conditions, there were treated 2α-difluoromethyl-androstan-17β-ol-3-one-17β-acetate and 2α-difluoromethyl-17α-methyl-19-nor-androstan-17β-ol-3-one thus affording the respective 2α-difluoromethyl-Δ⁴-androsten-17β-ol-3-one 17β-acetate and 2α-difluoromethyl-17α-methyl-19-nor-Δ⁴-androsten-17β-ol-3-one.

*Example XIV*

1 g. of 2α-difluoromethyl-17α-methyl-Δ⁴-androsten-17β-ol-3-one was dehydrogenized with selenium dioxide following exactly the procedure described in Example IV, affording 2-difluoromethyl-17α-methyl-Δ¹,⁴-androstadien-17β-ol-3-one.

Treatment in exactly the same way of 2α-fluoromethyl-Δ⁴-androsten-17β-ol-3-one 17-acetate afforded 2α-fluoromethyl Δ¹,⁴-androstadien-17β-ol-3-one 17-acetate.

*Example XV*

2 g. of 2-formyl-17α-methyl-Δ²-androsten-17β-ol obtained according to Example IX, in 100 cc. of carbon tetrachloride were treated with 4 g. of phosphorus pentachloride. The reaction mixture was kept in a closed vessel at room temperature overnight. Then it was poured carefully into ice water and extracted with methylene chloride. The extract was dried over sodium sulfate and evaporated to dryness. The solid residue was recrystallized from methylene chloride-hexane furnishing 2-dichloromethyl-17α-methyl-Δ²-androsten-17β-ol.

*Example XVI*

The above compound was treated with diborane such as described in Example X thus affording 2β-dichloromethyl-17α-methyl-androstan-3α-17β-diol.

*Example XVII*

1.5 g. of the foregoing steroid was oxidized with 8 N chromic acid following the technique described in Example XI, affording 2α-dichloromethyl-17α-methyl-androstan-17β-ol-3-one.

*Example XVIII*

1 g. of the latter compound was brominated and subsequently dehydrobrominated following the technique described in Example II, furnishing 2-dichloromethyl-17α-methyl-Δ¹-androsten-17β-ol-3-one.

*Example XIX*

1 g. of 2α-dichloromethyl-17α-methyl-androstan-17β-ol-3-one was brominated in the presence of hydrogen bromide and then dehydrobrominated following the procedure described in Example III, affording 2α-dichloromethyl-17α-methyl-Δ⁴-androsten-17β-ol-3-one.

*Example XX*

750 mg. of this last compound were treated with selenium dioxide by the procedure described in Example IV, yielding 2-dichloromethyl-17α-methyl-Δ¹,⁴-androstadien-17β-ol-3-one.

*Example XXI*

1 g. of 2α-difluoromethyl-androstan-17β-ol-3-one-17-acetate was refluxed with 0.5 g. of potassium hydroxide in 50 cc. of methanol for one hour. The mixture was poured into water, the resulting precipitate was filtered off, washed with water and dried. Recrystallization from acetone-hexane afforded 2α-difluoromethyl-androstan-17β-ol-3-one.

By the same technique were saponified the following starting compounds, furnishing the corresponding product hereafter set forth:

| Starting compound | Product |
| --- | --- |
| 17β-acetate of 2α-difluoromethyl-Δ⁴-androsten-17β-ol-3-one. | 2α-difluoromethyl-Δ⁴-androsten-17β-ol-3-one. |
| 17β-acetate of 2-difluoromethyl-Δ¹-androsten-17β-ol-3-one. | 2-difluoromethyl-Δ¹-androsten-17β-ol-3-one. |
| 17β-acetate of 2-difluoromethyl-Δ¹,⁴-androstadien-17β-ol-3-one. | 2-difluoromethyl-Δ¹,⁴-androstadien-17β-ol-3-one. |

*Example XXII*

750 mg. of 2α-difluoromethyl-androstan-17β-ol-3-one in 25 cc. of pyridine was treated with 1.5 g. of propionic anhydride. The reaction mixture was kept overnight at room temperature, it was then poured into water. The formed precipitate was filtered off, washed with water, dried and recrystallized from acetone-hexane thus giving the 17β-propionate of 2α-difluoromethyl-androstan-17β-ol-3-one.

Following exactly the same technique, from the starting compounds listed below there were obtained the corresponding products indicated hereafter:

| Starting material | Product |
|---|---|
| 2α-difluoromethyl-Δ⁴-androsten-17β-ol-3-one. | 17β-propionate of 2α-difluoromethyl-Δ⁴-androsten-17β-ol-3-one. |
| 2-difluoromethyl-Δ¹-androsten-17β-ol-3-one. | 17β-propionate of 2-difluoromethyl-Δ¹-androsten-17β-ol-3-one. |
| 2-difluoromethyl-Δ¹,⁴-androstadien-17β-ol-3-one. | 17β-propionate of 2-difluoromethyl-Δ¹,⁴-androstadien-17β-ol-3-one. |
| 2α-fluoromethyl-androstan-17β-ol-3-one. | 17β-propionate of 2α-fluoromethyl-androstan-17β-ol-3-one. |
| 2-fluoromethyl-Δ¹-androsten-17β-ol-3-one. | 17β-propionate of 2-fluoromethyl-Δ¹-androsten-17β-ol-3-one. |
| 2α-fluoromethyl-Δ⁴-androsten-17β-ol-3-one. | 17β-propionate of 2α-fluoromethyl-Δ⁴-androsten-17β-ol-3-one. |
| 2-fluoromethyl-Δ¹,⁴-androstadien-17β-ol-3-one. | 17β-propionate of 2-fluoromethyl-Δ¹,⁴-androstadien-17β-ol-3-one. |
| 2β-difluoromethyl-androstane-3α,17β-diol-17-acetate. | 3α-propionate of 2β-difluoromethyl-androstane-3α,17β-diol-17-acetate. |
| 2β-difluoromethyl-17α-methyl-19-nor-androstan-3α,17β-diol. | 3α-propionate of 2β-difluoromethyl-17α-methyl-19-nor-androstane-3α,17β-diol. |
| 2β-difluoromethyl-17α-methyl-androstane-3α,17β-diol. | 3α-propionate of 2β-difluoromethyl-17α-methyl-androstane-3α,17β-diol. |

Using exactly the same conditions except that propionic anhydride was substituted by caproic anhydride, cyclopentylpropionic anhydride and benzyl chloride, there were obtained the corresponding caproates, cyclopentylpropionates and benzoates of the above starting compounds.

*Example XXIII*

A solution of 1 g. of 2α - fluoromethyl - 17α - methyl-androstan-17β-ol-3-one, 1 g. of p-toluenesulfonic acid and 10 cc. of acetic anhydride in 50 cc. of acetic acid, was kept at room temperature for one hour, then it was poured into water and stirred until the excess anhydride had hydrolyzed. Extraction of the product with methylene chloride, washing of the extract until neutral, drying, evaporation and recrystallization of the residue from ethyl acetate-hexane afforded the 17β-acetate of 2α-fluoromethyl-17α-methyl-androstan-17β-ol-3-one.

Following exactly the same procedure, there were obtained from the starting compounds indicated the products set forth below:

| Starting compound | Product |
|---|---|
| 2-fluoromethyl-17α-methyl-Δ¹-androsten-17β-ol-3-one. | 17β-acetate of 2-fluoromethyl-17α-methyl-Δ¹-androsten-17β-ol-3-one. |
| 2α-fluoromethyl-17α-methyl-Δ⁴-androsten-17β-ol-3-one. | 17β-acetate of 2α-fluoromethyl-17α-methyl-Δ⁴-androsten-17-ol-3-one. |
| 2-fluoromethyl-17α-methyl-Δ¹,⁴-androstadien-17β-ol-3-one. | 17β-acetate of 2-fluoromethyl-17α-methyl-Δ¹,⁴-androstadien-17-ol-3-one. |
| 2α-chloromethyl-17α-methyl-androstan-17β-ol-3-one. | 17β-acetate of 2α-chloromethyl-17α-methyl-androstan-17β-ol-3-one. |
| 2α-chloromethyl-17α-methyl-19-nor-androstan-17β-ol-3-one. | 17β-acetate of 2α-chloromethyl-17α-methyl-19-nor-androstan-17-ol-3-one. |
| 2β-difluoromethyl-17α-methyl-androstane-3α,17β-diol. | 3α,17β-diacetate of 2β-difluoromethyl-17α-methyl-androstane-3α,17β-diol. |
| 2β-difluoromethyl-17α-methyl-19-nor-androstane-3α,17β-diol. | 3α,17β-diacetate of 2β-difluoromethyl-17α-methyl-19-nor-androstane-3α,17β-diol. |
| 2β-dichloromethyl-17α-methyl-androstane-3α,17-diol. | 3α,17β-diacetate of 2β-dichloromethyl-17α-methyl-androstane-3α,17β-diol. |
| 2-difluoromethyl-17α-methyl-Δ²-androsten-17β-ol. | 17β-acetate of 2-difluoromethyl-17α-methyl-Δ²-androsten-17β-ol. |
| 2-difluoromethyl-17α-methyl-19-nor-Δ²-androsten-17β-ol. | 17β-acetate of 2-difluoromethyl-17α-methyl-19-nor-Δ²-androsten-17β-ol. |
| 2α-difluoromethyl-17α-methyl-androstan-17β-ol-3-one. | 17β-acetate of 2α-difluoromethyl-17α-methyl-androstan-17β-ol-3-one. |
| 2α-difluoromethyl-17α-methyl-19-nor-androstan-17β-ol-3-one. | 17β-acetate of 2α-difluoromethyl-17α-methyl-19-nor-androstan-17β-ol-3-one. |
| 2α-dichloromethyl-17α-methyl-androstan-17β-ol-3-one. | 17β-acetate of 2α-dichloromethyl-17α-methyl-androstan-17β-ol-3-one. |

Following exactly the above technique except that acetic anhydride was substituted by propionic anhydride, caproic anhydride and cyclopentylpropionic anhydride, there were obtained the corresponding propionates, caproates and cyclopentylpropionates of the foregoing starting compounds.

We claim:
1. A compound of the following formula:

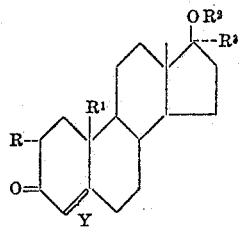

wherein R is selected from the group consisting of fluoromethyl, difluoromethyl, chloromethyl and dichloromethyl; $R^1$ is selected from the group consisting of hydrogen and methyl; $R^2$ is selected from the group consisting of hydrogen and a hydrocarbon carboxylic acyl group of less than 12 carbon atoms; $R^3$ is selected from the group consisting of hydrogen and an alkyl group containing up to 8 carbon atoms; and Y is selected from the group consisting of a double bond and a saturated linkage between C-4 and C-5.

2. 2α-fluoromethyl-17α-methyl-androstan-17β-ol-3-one.
3. 2α-chloromethyl-17α-methyl-androstan-17β-ol-3-one.
4. 2α-chloromethyl-17α-methyl-19-nor-androstan-17β-ol-3-one.
5. 2α-fluoromethyl-17α-methyl-Δ⁴-androsten-17β-ol - 3-one.
6. 2α-difluoromethyl-17α-methyl-androstan-17β-ol - 3-one.
7. 2α-difluoromethyl-17α-methyl-19-nor-androstan-17β-ol-3-one.
8. 2α-dichloromethyl-17α-methyl-androstan-17β-ol - 3-one.
9. The 17β-acetate of 2α-fluoromethyl-17α-methyl-androstan-17β-ol-3-one.
10. The 17β-acetate of 2α-chloromethyl-17α-methyl-androstan-17β-ol-3-one.
11. The 17β-acetate of 2α-chloromethyl-17α-methyl-19-nor-androstan-17β-ol-3-one.
12. 2α-fluoromethyl-androstan-17β-ol-3-one.
13. 2α-difluoromethyl-androstan-17β-ol-3-one.
14. A compound of the following formula:

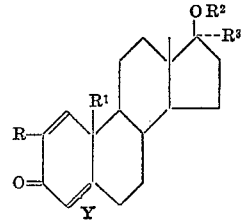

wherein R is selected from the group consisting of fluoromethyl, difluoromethyl, chloromethyl and dichloromethyl; $R^1$ is selected from the group consisting of hydrogen and methyl; $R^2$ is selected from the group consisting of hydrogen and a hydrocarbon carboxylic acyl group of less than 12 carbon atoms; $R^3$ is selected from the group consisting of hydrogen and an alkyl group containing up to 8 carbon atoms; and Y is selected from the group consisting of a double bond and a saturated linkage between C-4 and C-5.

15. 2-fluoromethyl-17α-methyl-Δ¹-androsten-17β-ol - 3-one.
16. 2-fluoromethyl-17α-methyl-Δ¹,⁴-androstadien-17β-ol-3-one.
17. 2-fluoromethyl-Δ¹,⁴-androstadien-17β-ol-3-one.
18. 2-difluoromethyl-Δ¹,⁴-androstadien-17β-ol-3-one.

19. A method for the production of 2α-halomethyl-androstane derivatives which comprises treating the corresponding 2-hydroxymethylene-3-ketone with a halo-iodomethane in the presence of an alkali metal alkoxide and an inert solvent followed by, and subsequent elimination of the formyl group thus formed by refluxing in the presence of an alkali metal acetate.

20. The method of claim 19 wherein the 2α-halomethyl derivative is a 2α-fluoromethyl derivative, the halo-iodomethane is fluoro-iodomethane, the alkali metal alkoxide is potassium t-butoxide and the inert solvent is benzene.

21. The method of claim 19 wherein the 2α-halomethyl derivative is a 2α-chloromethyl derivative, the halo-iodomethane is chloro-iodomethane, the alkali metal alkoxide is potassium t-butoxide and the inert solvent is benzene.

22. A method for the production of 2-dihalomethyl-androstane derivatives which comprises treatment of the corresponding 2-formyl-$\Delta^2$-androsten derivative with a halogenating agent selected from the group consisting of sulfur tetrafluoride, phosphorous pentachloride, dichloro-iodomethane and difluoroiodomethane in an inert solvent.

23. The method of claim 22 wherein the 2-dihalomethyl derivative is a 2-difluoromethyl-androstane derivative, the halogenating agent is sulfur tetrafluoride and the inert solvent is benzene.

24. The method of claim 22 wherein the 2-dihalomethyl-compound is a 2-dichloromethyl-androstane derivative, the halogenating agent is phosphorus pentachloride and the inert solvent is carbon tetrachloride.

25. 2-difluoromethyl-17α-methyl-$\Delta^2$-androsten-17β-ol.

26. 2 - dichloromethyl-17α-methyl-$\Delta^2$-androsten-17β-ol.

27. 2 - difluoromethyl-17α-methyl-19-nor-$\Delta^2$-androsten-17β-ol.

No references cited.